J. B. DE MARS.
ANGLE CUTTING MACHINE.
APPLICATION FILED JUNE 13, 1918.

1,319,272.

Patented Oct. 21, 1919.
4 SHEETS—SHEET 2.

J. B. DE MARS.
ANGLE CUTTING MACHINE.
APPLICATION FILED JUNE 13, 1918.

1,319,272.

Patented Oct. 21, 1919.
4 SHEETS—SHEET 3.

Inventor
John B. De Mars

W. J. FitzGerald & Co.
Attorneys

J. B. DE MARS.
ANGLE CUTTING MACHINE.
APPLICATION FILED JUNE 13, 1918.
1,319,272.
Patented Oct. 21, 1919.
4 SHEETS—SHEET 4.
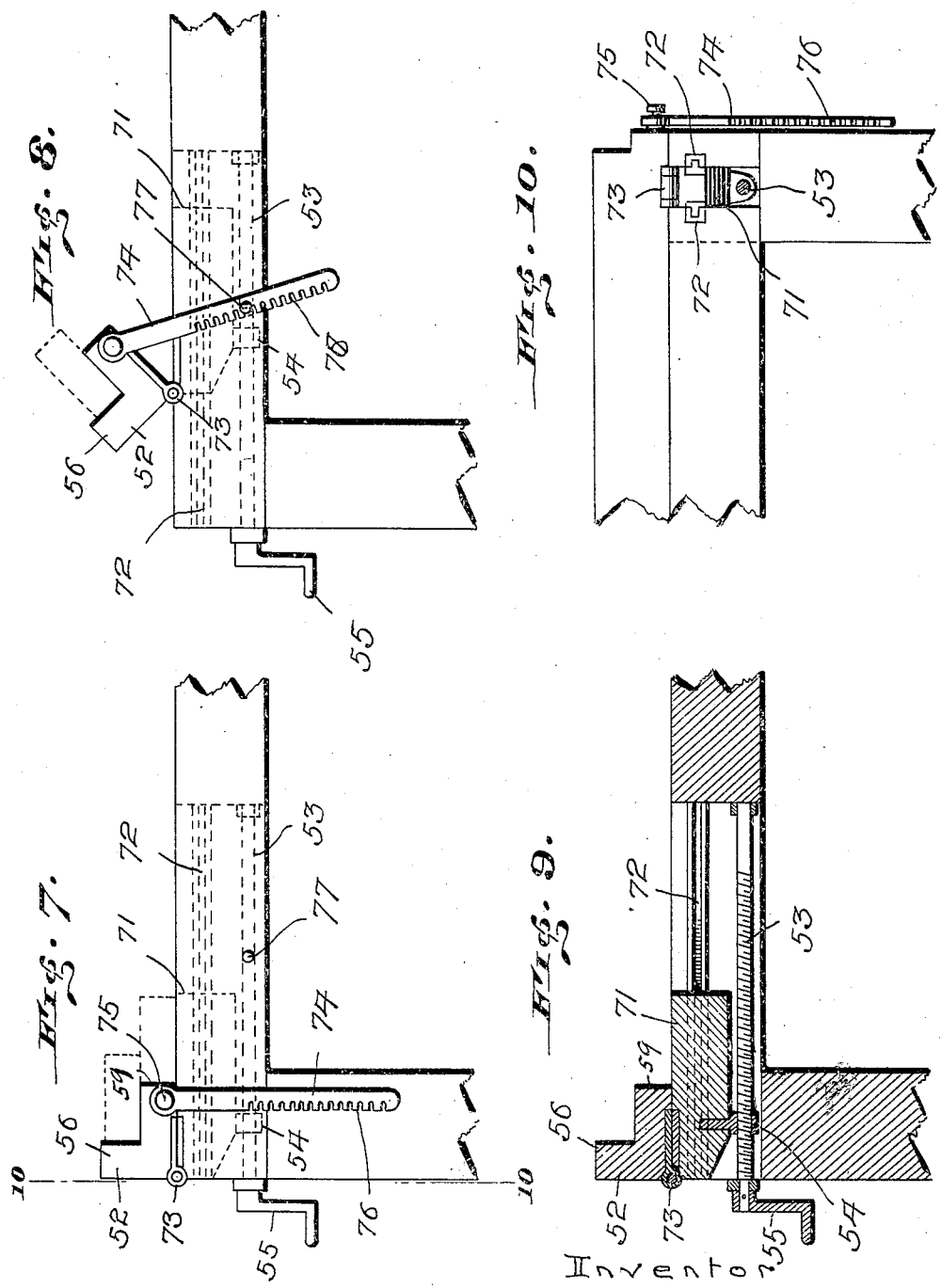

UNITED STATES PATENT OFFICE.

JOHN BAPTISTE DE MARS, OF PORTLAND, OREGON.

ANGLE-CUTTING MACHINE.

1,319,272. Specification of Letters Patent. Patented Oct. 21, 1919.

Application filed June 13, 1918. Serial No. 239,866.

*To all whom it may concern:*

Be it known that I, JOHN B. DE MARS, a citizen of the United States, residing at Portland, in the county of Multnomah and State of Oregon, have invented certain new and useful Improvements in Angle-Cutting Machines; and I do hereby declare the following to be a full, clear, and exact description of the invention, such as will enable others skilled in the art to which it appertains to make and use the same.

This invention relates to an angle cutting machine and particularly to a construction adapted to cut material at an angle and also to effect straight cuts thereon.

The invention has for an object to provide a shiftable support having a plurality of saws mounted thereon at an angle to each other so that said saws may be disposed at an angle to the longitudinal axis of the material to be cut or parallel to said axis as the conditions of work may require.

A further object of the invention is to provide a novel construction embodying a plurality of saws shiftably mounted and disposed at an angle to each other, together with means by which said saws may be successively brought into contact with the work to effect a cut, the lines of which are disposed at an acute angle to each other.

Another object of the invention is to provide a novel and improved construction of work support adapted to receive the material when an angle cut is to be made in one surface thereof or to shift said material into position for longitudinal sawing or cut-off work.

A further object of the invention is to provide a novel pivoted frame for each of the saws, together with a shiftable support carrying these frames and also the driving mechanism for the saws.

Other and further objects and advantages of the invention will be hereinafter set forth and the novel features thereof defined by the appended claims.

In the drawings,

Figure 1 is a top plan of the invention.

Fig. 2, a horizontal section on line 2—2 of Fig. 3.

Fig. 3, an end elevation looking from the left of Fig. 1.

Fig. 4, a detail elevation of the shifting support for the saws.

Fig. 5, a detail front elevation of the controlling lever for alternately shifting the saw frames.

Fig. 6, a plan of one character of work accomplished by the invention.

Fig. 7 is an end elevation of the work support.

Fig. 8 is a similar view with the support tilted.

Fig. 9 is a vertical section through the support; and

Fig. 10 is an elevation thereof on line 10—10 of Fig. 7.

Like numerals refer to like parts in the several figures of the drawings.

The numeral 10 designates a supporting frame for the machine which may be of any desired character and if preferred provided with wheels or rollers 11 by which it may be readily shifted into any position desired convenient to the work. Within this frame a saw support or table 12 is pivotally mounted at 13 upon a suitable bearing provided in the frame 10 and adapted for an oscillatory travel sufficient to properly present the saw to the work.

Figure 2:
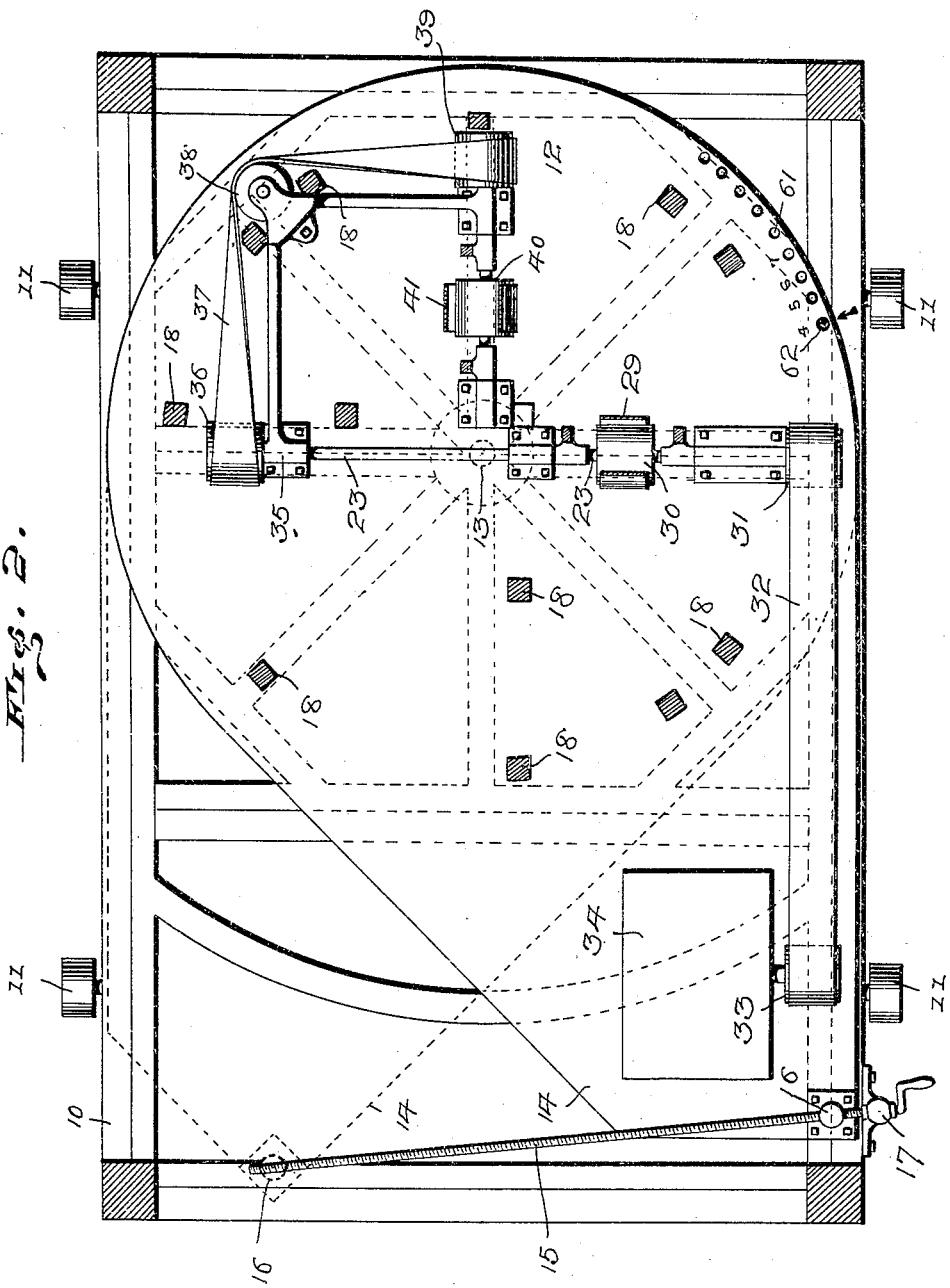

The table 12 is formed with an extension 14 which comprises substantially a lever portion, and the shifting thereof from the position shown by full lines to that indicated by dotted lines in Fig. 2 may be effected by any desired means. A very convenient form of such means comprises the feed screw 15 which is threaded through a swiveled bearing 16 carried by the extension 14 and also rotatably mounted in a swiveled bearing 17 carried upon the frame 10, as shown in Fig. 2. The shifting table 12 is formed with a series of uprights 18 supporting a circular top frame 19 which is disposed to travel within and flush with a concentric top portion 20 mounted upon the stationary frame 10. By this means any shifting of the saw table upon its pivot is prevented and a proper travel thereof insured. For the purpose of determining the exact angle at which the saw shall be disposed relative to the work, the table 12 is provided with a series of properly designated apertures 61. A retaining pin 62 extends through one of these apertures and into a socket in a fixed part of the frame 10 to securely hold the parts in adjusted position.

The saw frames 21 and 22 are substantially similar in construction and are each mounted at their lower portions to swing upon a driving shaft 23 mounted in bearing boxes 24 carried by the shifting support 12. The arbors 25 of saws 26 are pivoted in the usual manner in boxes 27 at the upper ends of the frames 21 and these arbors provided with a driving pulley 28 from which a belt 29 extends to a similar pulley 30 upon the driving shaft 23, see Fig. 3. The end of the shaft 23 is provided with a pulley 31 from which a belt 32 extends to a pulley 33 upon the shaft of any desired form of motor, as indicated at 34. This motor may be electrically or otherwise driven.

For the purpose of driving the saw 26 carried by the frame 22 which is disposed at an angle to the frame 21, just described, the shaft 23 is extended to a bearing 35 and carries a driving pulley 36 from which a belt 37 extends over a guide pulley 38 to a pulley 39 carried by the shaft 40 which is disposed at a right angle to the shaft 23. From the shaft 40 a pulley 41 extends to the saw arbor as described in connection with the frame 21. These frames may also be provided at their upper portion with any convenient form of handle 42 by which they may be manually shifted in using the saws for rip sawing or cut-off work. In order to support the saw when not in use the pivoted frame thereof may rest upon a bumper 63 carried by a support 64, while the saw frame may be adjusted and held in cutting position by the toggle comprising a member 65 pivoted to the frame at the hook 51 and also pivoted at 66 to an adjusting bar 67 having a series of notches to fit over a pin 68 on support 64. This toggle arrangement when straightened firmly supports the saw frame at the desired angle.

Figure 1:
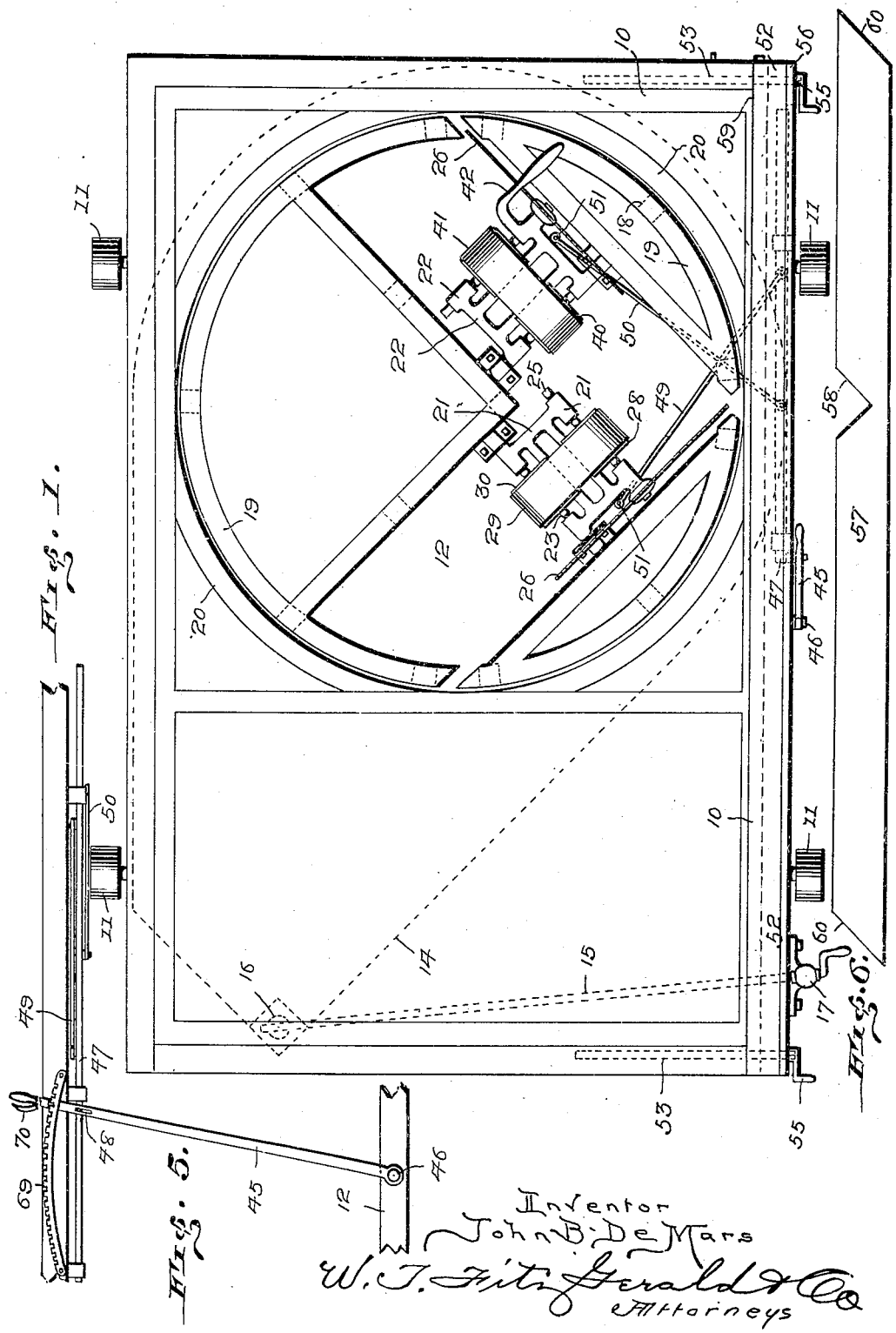

When the mechanism is used for angle cutting either at the ends of a beam or piece of material or for producing an inset or notch intermediate said ends, it is desirable to introduce the saws successively to the work so that one angle is first cut and the saw then cutting moved out of operation while the saw to cut the opposite angle is immediately brought into operative position. Means for effecting this function in a very simple manner are provided in the controlling lever 45 pivotally mounted at 46 upon the lower portion of the fixed frame and connected with a horizontally disposed slide bar or guide 47 by means of a pin and slot connection 48, as shown in Figs. 1 and 5. This lever 45 and the parts carried thereby may be retained in adjusted position by a toothed sector 69 coöperating with a latch 70 upon the lever. This slide bar 47 has extending therefrom connectors 49 and 50 extending to the saw frames 21 and 22, respectively. As these connectors are disposed in different horizontal planes and at an angle to each other, the shifting movement of the slide bar or guide will successively bring one saw into cutting position and shift the opposite saw away from such position. This operation is effective in the production of inset-cut or notched work, but if one of the saws be used for rip or longitudinal cutting relative to the material, these connectors are released from the saw frame and folded back into position to permit the shifting of the saw support on its pivot. This may be accomplished by any preferred construction, for instance, an open hook 51 on the saw frames.

A work support 52 is mounted upon one side of the fixed frame 10 for adjustment toward and from the shifting saw support. A desirable form of means for shifting the work support is shown by dotted lines in Figs. 1 and 3, and comprises a feed screw 53 pivotally mounted in the upper portion of the frame 10 and extending through a depending threaded lug 54 from the work support 52. The outer end of this screw is provided with an operating handle 55 by which the parts may be adjusted as desired. The lug 54 is carried by a slide block 71 mounted to travel in ways 72 in the fixed frame, and the work support 52 is pivotally mounted at 73 upon the outer edge of said block so as to tilt or swing upward therefrom as shown in Fig. 8. The support may be held in this or any desired tilted position by the adjusting bar 74 pivoted thereon at 75 and having a series of recesses 76 to engage a pin 77 on the fixed frame.

The work support 52 is formed at its outer edge with an upright shoulder 56 which is particularly convenient in performing certain classes of work such as in connection with the preparation of material are similarly and successively cut. Under such conditions, if the strip of material indicated by 57 in Fig. 6 be mounted upon the support in contact with the shoulder 56, the notched cut will only extend for a portion of the width of the strip or beam, producing a notch as indicated at 58, while if the strip 57 be pushed toward the saw so as to be in contact with the inner edge 59 of the work support, it is sufficiently advanced to effect the angular cut-offs 60 at each end thereof.

Figure 3:
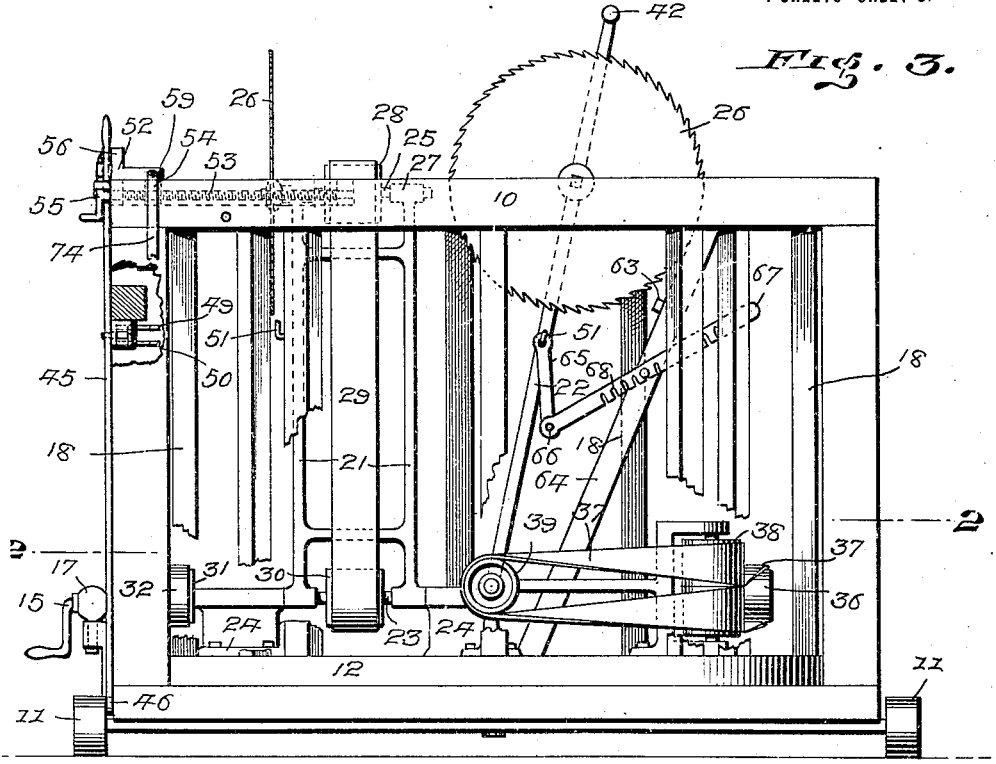
Figure 4:
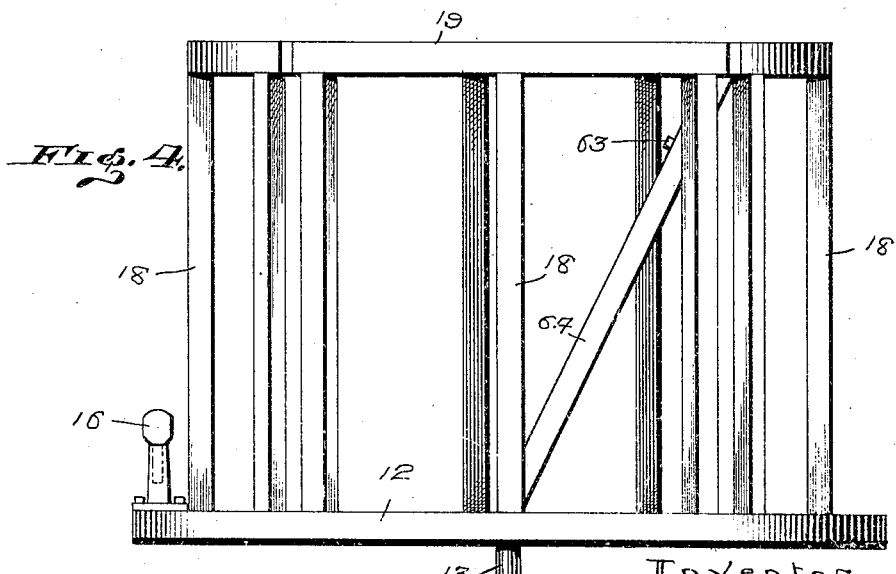

In the operation of the invention for the purpose of producing stock or ready cut work such as shown in Fig. 6, the saws are adjusted to operate at an angle to the material upon the work holder. The lever is then shifted to bring the right hand saw into position to cut the advanced end of the work and while in this position one angle of the notch is cut. The opposite angle of this notch is cut by a reverse movement of the lever which throws the left hand saw into operative position. The lever is then restored to its first position, making the final cut at the opposite end of the work. It will be understood that in making these final or cut-off cuts, the work is advanced upon the holder sufficiently to permit the saw to pass entirely through the material, while when the notch is formed, the work is supported at a distance from the saw against the flange of the work holder. When it is desired to use the saws for the purpose of longitudinal or rip sawing, the movable support or table is shifted to the position shown in Figs. 2 and 3 so that one of the saws operates parallel with the longitudinal axis of the work while the other saw is in position to operate at a right angle thereto and may be used for cut-off work. In shifting to this position for special rip sawing work, the connectors between the swinging saw frame are detached therefrom and folded out of the path of the travel of the saw table, as shown in Fig. 3. The motive power and driving means for the saws is mounted upon the movable support so that all parts may be simultaneously shifted by the operation of the feed screw and when connected with the controlling lever, the saws may be successively presented to the work for the purpose of cutting opposite or different angles thereon. When these pivoted saw frames are disconnected from the controlling lever, they may be independently operated by means of the handles thereon.

It will be noticed that when the saw is not in use the frame rests upon the bumper so that the entire saw structure is removed from interference with the feed of material to the other saw. The toggle connection provides means for setting and holding the saw at any desired angle to a vertical line, and may be adjusted for that purpose. This feature with the adjustment of the saw table to the designated angle for different cuts, provides means for accomplishing a wide range of work and is particularly adapted for cutting roof timbers where the preferred pitch can be accurately secured by a proper adjustment of the parts, and each of a series of rafters cut in exactly the same manner. The adjustment of the work holder upon its pivot also provides means for presenting the material to the saw in position particularly adapted for cutting jack rafters as shown in Fig. 8.

In Fig. 7, the beam or rafter is shown in dotted lines in the upper position, where it is spaced from the saw sufficient for notching purposes, while in the lower dotted position it is advanced sufficiently for a complete cut, so that these two operations may be performed without changing or adjusting the work support, but simply by slipping the material from one position to another thereon. When it is desired to use the support for rip sawing, it may be fed inward a sufficient distance to cut the desired width material from the beam.

It will be seen that this construction greatly economizes in the time and labor required for angle cutting, particularly in ready cut work, and is also adapted for square work and rip sawing. The invention also presents an economical, simple and very efficient construction by which the saws may be supported and shifted so as to secure a positive operation relative to the material upon the work holder.

While the invention has been described as being particularly adapted to a certain class of work, still it is not limited thereto in its application nor in the construction of the details by which the parts are supported and driven.

What I claim is:—

1. An angle cutting machine embodying a supporting frame having a top portion, a table mounted for rotation within the supporting frame and having a top member located within and flush with the top portion of the frame, upstanding saw frames mounted for swinging movement on said table in planes at right angles with one another, rotary saws carried by said saw frames within said top member of the table at one side of said work support, means for turning said table and holding it in different angular positions, driving means mounted on said table and connected with said saws, and a single operating member connected with both saw frames to swing either one toward the work support and the other away from said support.

2. In an angle cutting machine, a pair of saws mounted for movement at an angle to each other to alternately move to a cutting position, a slide, manual means for shifting said slide, and connections between the slide and saws whereby one saw is moved to and the other saw moved out of cutting position.

3. In an angle cutting machine, a supporting frame, a table mounted for rotation therein, a pair of saws mounted on the table for movement at an angle to each other to alternately move to cutting position, a single controlling member carried by the supporting frame, and connections between said controlling member and saws for moving either saw into and the other saw out of cutting position at different positions of said table.

In testimony whereof I have signed my name to this specification in the presence of two subscribing witnesses.

JOHN BAPTISTE DE MARS.

Witnesses:
EDWARD HOLMAN,
WALTER J. HOLMAN.

Copies of this patent may be obtained for five cents each, by addressing the "Commissioner of Patents, Washington, D. C."